United States Patent
Yao et al.

(10) Patent No.: US 9,026,542 B2
(45) Date of Patent: May 5, 2015

(54) SYSTEM AND METHOD FOR MODELLING AND PROFILING IN MULTIPLE LANGUAGES

(75) Inventors: Hong Yao, Newark, CA (US); Wu Wang, Los Altos, CA (US); Mei Marker, Santa Clara, CA (US); Kelvin Edmison, Ottawa (CA); Wei Wang, Milpitas, CA (US)

(73) Assignee: Alcatel Lucent, Boulogne Billancourt (FR)

( * ) Notice: Subject to any disclaimer, the term of this patent is extended or adjusted under 35 U.S.C. 154(b) by 318 days.

(21) Appl. No.: 12/842,921

(22) Filed: Jul. 23, 2010
(Under 37 CFR 1.47)

(65) Prior Publication Data

US 2011/0276577 A1 Nov. 10, 2011

Related U.S. Application Data

(60) Provisional application No. 61/228,552, filed on Jul. 25, 2009.

(51) Int. Cl.
*G06F 17/30* (2006.01)

(52) U.S. Cl.
CPC .... *G06F 17/30867* (2013.01); *G06F 17/30702* (2013.01)

(58) Field of Classification Search
CPC ............... G06F 17/30669; G06F 17/30867; G06F 17/30702
USPC ........................................................ 707/750
See application file for complete search history.

(56) References Cited

U.S. PATENT DOCUMENTS

| | | | |
|---|---|---|---|
| 7,370,034 B2* | 5/2008 | Franciosa et al. | 707/749 |
| 2004/0102957 A1* | 5/2004 | Levin | 704/3 |
| 2005/0021517 A1* | 1/2005 | Marchisio | 707/4 |
| 2006/0074980 A1* | 4/2006 | Sarkar | 707/104.1 |
| 2006/0173886 A1* | 8/2006 | Moulinier et al. | 707/101 |
| 2007/0106500 A1* | 5/2007 | Loofbourrow et al. | 704/10 |
| 2008/0294630 A1* | 11/2008 | Yan et al. | 707/5 |
| 2009/0024613 A1* | 1/2009 | Niu et al. | 707/5 |
| 2009/0055764 A1* | 2/2009 | Katsumata | 715/764 |

(Continued)

OTHER PUBLICATIONS

James Powel et al, "Multilingual Federated Searching Across Heterogeneous Collections", Sep. 1998, D-Lib Magazine, pp. 1-12.*

(Continued)

*Primary Examiner* — Etienne Leroux
*Assistant Examiner* — Jared Bibbee
(74) *Attorney, Agent, or Firm* — Wolff & Samson PC

(57) ABSTRACT

A system and method for generating feature vectors of documents in different languages are provided. The feature vectors provide scores associated with keywords defined in a base language for use by a profiler for generating or updating a user profile. The system and method use a plurality of keyword sets comprising: a base language keyword set comprising a plurality of base language keywords each associated with a respective identifier (ID); and a second language keyword set comprising a plurality of second language keywords each corresponding in meaning to a respective one of the base language keywords and associated with the ID of the corresponding base language keyword. One of a plurality of tokenizers is selected to parse a document based on the language of the document and to generate the feature vector using the keyword set of the corresponding language.

20 Claims, 7 Drawing Sheets

(56) References Cited

U.S. PATENT DOCUMENTS

| | | | |
|---|---|---|---|
| 2009/0119281 A1* | 5/2009 | Wang et al. | 707/5 |
| 2009/0132590 A1* | 5/2009 | Huang | 707/104.1 |
| 2009/0222437 A1* | 9/2009 | Niu et al. | 707/5 |
| 2010/0114878 A1* | 5/2010 | Lu et al. | 707/723 |
| 2010/0138370 A1 | 6/2010 | Wu et al. | |
| 2010/0174716 A1* | 7/2010 | Elbaz et al. | 707/737 |
| 2010/0287162 A1* | 11/2010 | Shirwadkar | 707/740 |

OTHER PUBLICATIONS

Kikui et al, "Cross-lingual Information Retrieval on the WWW", 1996, Mulsaic 96, pp. 1-6.*

* cited by examiner

SYSTEM AND METHOD FOR MODELLING AND PROFILING IN MULTIPLE LANGUAGES

CROSS-REFERENCE TO RELATED APPLICATIONS

This application claims priority under 35 U.S.C. §119(e) to U.S. Provisional Application Ser. No. 61/228,552, filed on Jul. 25, 2009, the content of which is hereby incorporated by reference in its entirety.

BACKGROUND OF INVENTION

1. Field of the Invention

The present disclosure relates to the field of modelling a text based document for use in generating a user content preference profile and in particular to a system and method for modelling text based documents in multiple languages.

2. Background Art

Content modelling and profiling systems allow content that can be accessed by a user to be modelled. The modeling results may then be used by a profiling system to generate user's interest and update a profile associated with a user when the user accesses the content such as electronic or internet based content such as web-pages, text based content such as e-books, audio and video related content electronically accessible by a users through a network. The user profile may be used for various purposes. For example, a user profile may be used to indicate the user's preferences or interests as determined by the profiling system based on the content the user has accessed. User profiles may be used by an advertising provider in order to provide targeted ads to the user based on the profile.

Typically, a modelling and profiling system are designed to process content that can be defined by text based documents either providing the content or metadata describing the content and build profiles in a common language. As such, if the content a user views are in different languages, a single modelling and profiling system is not able to build a user profile based on all of the content viewed by the user. If multiple modelling and profiling systems are used, it is difficult to create and maintain all of the different modelling and profiling systems.

As such, it is desirable to have a modelling a profiling system that can model documents in different languages and create or update profiles based on the modeling results.

SUMMARY OF INVENTION

In general, in one aspect, the invention relates to a content modelling system generating feature vectors of documents in different languages, the feature vectors providing scores associated with keywords defined in a base language for use by a profiler for generating or updating a user profile defining user preferences. The system comprises: a memory unit for storing instructions and data; and a processing unit for executing the instructions to provide: a plurality of keyword sets comprising: a base language keyword set comprising a plurality of base language keywords each associated with a respective identifier (ID); and a second language keyword set comprising a plurality of second language keywords each corresponding in meaning to a respective one of the base language keywords and associated with the ID of the corresponding base language keyword; a plurality of tokenizers, each tokenizer associated with a language and a respective keyword set of the plurality of keyword sets, each tokenizer for: receiving a text based document in the associated language of the tokenizer; parsing the received document to identify keywords from the associated keyword set occurring in the received document; and generating a plurality of ID:score pairs, each pair associating a score with an ID of a keyword in the associated keyword set occurring in the document, the score based on the frequency of occurrence of the ID corresponding to the keyword in the document; a language identifier for receiving the document and identifying the language of the document as one of the base language or the second language; and a tokenizer selector for receiving the identified language and selecting a corresponding tokenizer to parse the received document and produce a feature vector of the received document from the generated ID:score pairs.

In general, in one aspect, the invention relates to a method for generating feature vectors of documents in different languages, the feature vectors providing scores associated with keywords defined in a base language for use by a profiler for generating or updating a user profile defining user preferences. The method comprises: receiving at a processing unit a document and identifying the language of the document as one of a base language or a second language; selecting a corresponding tokenizer based on the identified language to parse the received document and produce a feature vector of the received document, the tokenizer selected from a plurality of tokenizers stored in a memory unit, each tokenizer of the plurality of tokenizers associated with a language and a respective keyword set of a plurality of keyword sets stored in the memory unit; parsing the received document using the selected tokenizer to identify keywords occurring in the received document, the keywords stored in a keyword set associated with the language of the selected tokenizer and an ID of a corresponding keyword in a base language keyword set; and generating a feature vector from a plurality of ID:score pairs, each pair associating a score with an ID of a keyword in the associated keyword set occurring in the document, the score based on the frequency of occurrence of the ID corresponding to the keyword in the document.

In general, in one aspect, the invention relates to a computer readable memory storing instructions for configuring a processing unit and a memory unit for providing a method for generating feature vectors of documents in different languages, the feature vectors providing scores associated with keywords defined in a base language for use by a profiler for generating or updating a user profile defining user content preferences. The method comprises: receiving at the processing unit a document and identifying the language of the document as one of a base language or a second language; selecting a corresponding tokenizer based on the identified language to parse the received document and produce a feature vector of the received document, the tokenizer selected from a plurality of tokenizers stored in a memory unit, each tokenizer of the plurality of tokenizers associated with a language and a respective keyword set of a plurality of keyword sets stored in the memory unit; parsing the received document using the selected tokenizer to identify keywords occurring in the received document, the keywords stored in a keyword set associated with the language of the selected tokenizer and an ID of a corresponding keyword in a base language keyword set; and generating a feature vector from a plurality of ID:score pairs, each pair associating a score with an ID of a keyword in the associated keyword set occurring in the document, the score based on the frequency of occurrence of the ID corresponding to the keyword in the document.

Other aspects of the invention will be apparent from the following description and the appended claims.

BRIEF DESCRIPTION OF DRAWINGS

A system and method of modelling and profiling content in multiple languages will be described with reference to the attached figures in which.

DETAILED DESCRIPTION

Figure 1:
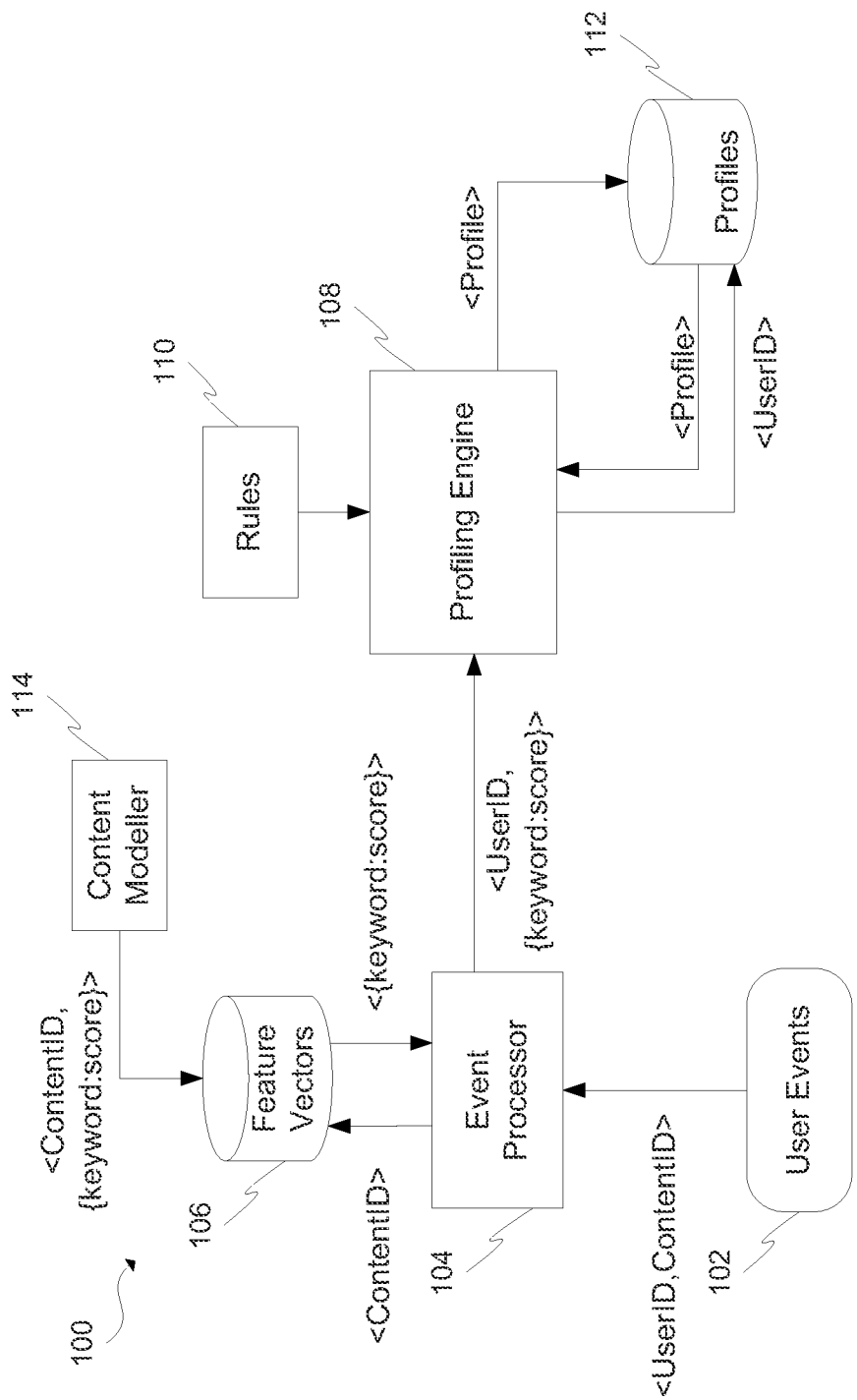
FIG. 1 depicts in a block diagram a system for modelling and profiling.

In accordance with an aspect of the present disclosure there is provided a content modelling system generating feature vectors of documents in different languages, the feature vectors providing scores associated with keywords defined in a base language for use by a profiler for generating or updating a user profile defining user preferences. The content modelling system comprising a memory unit for storing instructions and data; and a processing unit for executing the instructions to provide a plurality of keyword sets comprising a base language keyword set comprising a plurality of base language keywords each associated with a respective identifier (ID); and a second language keyword set comprising a plurality of second language keywords each corresponding in meaning to a respective one of the base language keywords and associated with the ID of the corresponding base language keyword; a plurality of tokenizers, each tokenizer associated with a language and a respective keyword set of the plurality of keyword sets. Each tokenizer for receiving a text based document in the associated language of the tokenizer; parsing the received document to identify keywords from the associated keyword set occurring in the received document; and generating a plurality of ID:score pairs. Each pair associating a score with an ID of a keyword in the associated keyword set occurring in the document, the score based on the frequency of occurrence of the ID corresponding to the keyword in the document; a language identifier for receiving the document and identifying the language of the document as one of the base language or the second language; and a tokenizer selector for receiving the identified language and selecting a corresponding tokenizer to parse the received document and produce a feature vector of the received document from the generated ID:score pairs.

In accordance with an aspect of the present disclosure there is provided a method for generating feature vectors of documents in different languages, the feature vectors providing scores associated with keywords defined in a base language for use by a profiler for generating or updating a user profile defining user preferences. The method comprising receiving at a processing unit a document and identifying the language of the document as one of a base language or a second language; selecting a corresponding tokenizer based on the identified language to parse the received document and produce a feature vector of the received document, the tokenizer selected from a plurality of tokenizers stored in a memory unit, each tokenizer of the plurality of tokenizers associated with a language and a respective keyword set of a plurality of keyword sets stored in the memory unit; parsing the received document using the selected tokenizer to identify keywords occurring in the received document, the keywords stored in a keyword set associated with the language of the selected tokenizer and an ID of a corresponding keyword in a base language keyword set; and generating a feature vector from a plurality of ID:score pairs, each pair associating a score with an ID of a keyword in the associated keyword set occurring in the document, the score based on the frequency of occurrence of the ID corresponding to the keyword in the document.

In accordance with an aspect of the present disclosure there is provided a computer readable memory storing instructions for configuring a processing unit and a memory unit for providing a method for generating feature vectors of documents in different languages, the feature vectors providing scores associated with keywords defined in a base language for use by a profiler for generating or updating a user profile defining user content preferences. The method comprising: receiving at the processing unit a document and identifying the language of the document as one of a base language or a second language; selecting a corresponding tokenizer based on the identified language to parse the received document and produce a feature vector of the received document, the tokenizer selected from a plurality of tokenizers stored in a memory unit, each tokenizer of the plurality of tokenizers associated with a language and a respective keyword set of a plurality of keyword sets stored in the memory unit; parsing the received document using the selected tokenizer to identify keywords occurring in the received document, the keywords stored in a keyword set associated with the language of the selected tokenizer and an ID of a corresponding keyword in a base language keyword set; and generating a feature vector from a plurality of ID:score pairs, each pair associating a score with an ID of a keyword in the associated keyword set occurring in the document, the score based on the frequency of occurrence of the ID corresponding to the keyword in the document.

FIG. 1 depicts in a block diagram a system 100 for content modelling and profiling. The system 100 receives user events 102. As depicted, a user event may comprise a user identifier (UserID) and an indication of the content to be accessed (ContentID). If the system 100 is used in a network environment for modelling and profiling subscriber's web traffic the UserID may be, for example, an Internet Protocol (IP) address. Additionally or alternatively, the UserID may be translated or transformed to another identifier. For example an IP address may be translated to a MAC address or user name associated with the IP address and used as the UserID. The ContentID of the user event 102 may be a Uniform Resource Locator (URL) specifying a document requested by the user. The user event 102 is passed to an event processor 104. The event processor 104 retrieves a feature vector associated with the requested document from a repository 106. The repository 106 stores a plurality of feature vectors, each associated with a respective document. The repository 106 may store each feature vector with an associated ContentID used to request the respective document, allowing the feature vector for a particular ContentID to be retrieved when the associated document has been requested by a user.

The feature vector may comprise a plurality of keyword:score pairings. The keywords of the feature vector are keywords from a keyword set that occur in the particular document. The score associated with each keyword is determined based on the frequency of occurrence of the keyword in the document and the weight of the keyword as determined from previously collected documents. As such, the feature vector provides a standard representation of the document that provides an indication of the meaning of the document. The feature vector associated with a particular document may be generated automatically and as such the indication of the meaning of the content defined the text document provided by the feature vector may not precisely match the actual or intended meaning of the document; however, the feature vector may provide a 'good enough' representation of the content.

Once the event processor 104 has retrieved the feature vector associated with the content indicated by the contentID, the userID and the feature vector is passed to a profiling engine 108. The profiling engine 108 retrieves and updates a user profile associated with the userID, or generates a new user profile if one is not already associated with the UserID. The user profile provides an indication of categories of interest associated with the user. The user profile is a set of category:score pairings. Each category in a user profile corresponds to a category in a category ontology that provides a hierarchical grouping of categories. The score associated with each category provides an indication of the user's interest in a particular category. The user profile may be used for various purposes, including for example, providing information to the user based on their interests as determined from the user profile. The information may be for example advertisements.

The user profile is based on the documents viewed or accessed by the user. The profiling engine 108 applies one or more rules or models 110 to update the user profile based on the feature vector. The rules or models 110 provide information to the profiling engine 108 on how to update the category:score pairings of the user profile based on the keyword:score pairings of the feature vector of a document that has been accessed or requested by the user. The rules or models 110 may provide a basic mapping between keywords of the content and categories of the user profile. Additionally or alternatively, the rules or models 110 may encapsulate more complex relationships between keywords and categories represented by models which are learned from previously collected documents. The rules or models 110 may be a static set of rules or models or may be periodically updated. Furthermore, the rules or models 110 may be automatically generated from data mining of user information that may provide a correlation between documents viewed and information or categories of interest. Once the user profile is generated or updated by the profiling engine 108 it is stored in the profile repository 112 and used to provide targeted information.

The feature vectors used by the profiling engine 108 may be generated by a content modeller 114. The content modeller 114 processes a document in order to generate the keyword:score pairings of the feature vector. The content modeller 114 uses a keyword set of keywords that are used by the profiling engine 108 and processes the document in order to determine the frequency of occurrence of the keywords from the keyword set in the document. The score associated with each keyword from the keyword set that occurs in the document may be based on the frequency of occurrence of the keyword and the weight of the keyword determined from previously collected documents.

The modelling and profiling system 100 can be used to generate and update user profiles based on the documents viewed or requested by the user. The documents may be various documents, for example, the documents may be a web page, or other electronically accessible documents such as books, brochures, etc.

The modelling and profiling system 100 provides a way to generate user profiles based on a feature vector of documents viewed or accessed by the user. However, the keywords used by the content modeller must correspond to keywords known by the profiler. As such, the modelling and profiling system 100 only provides modelling and profiling in a single language.

Figure 2:
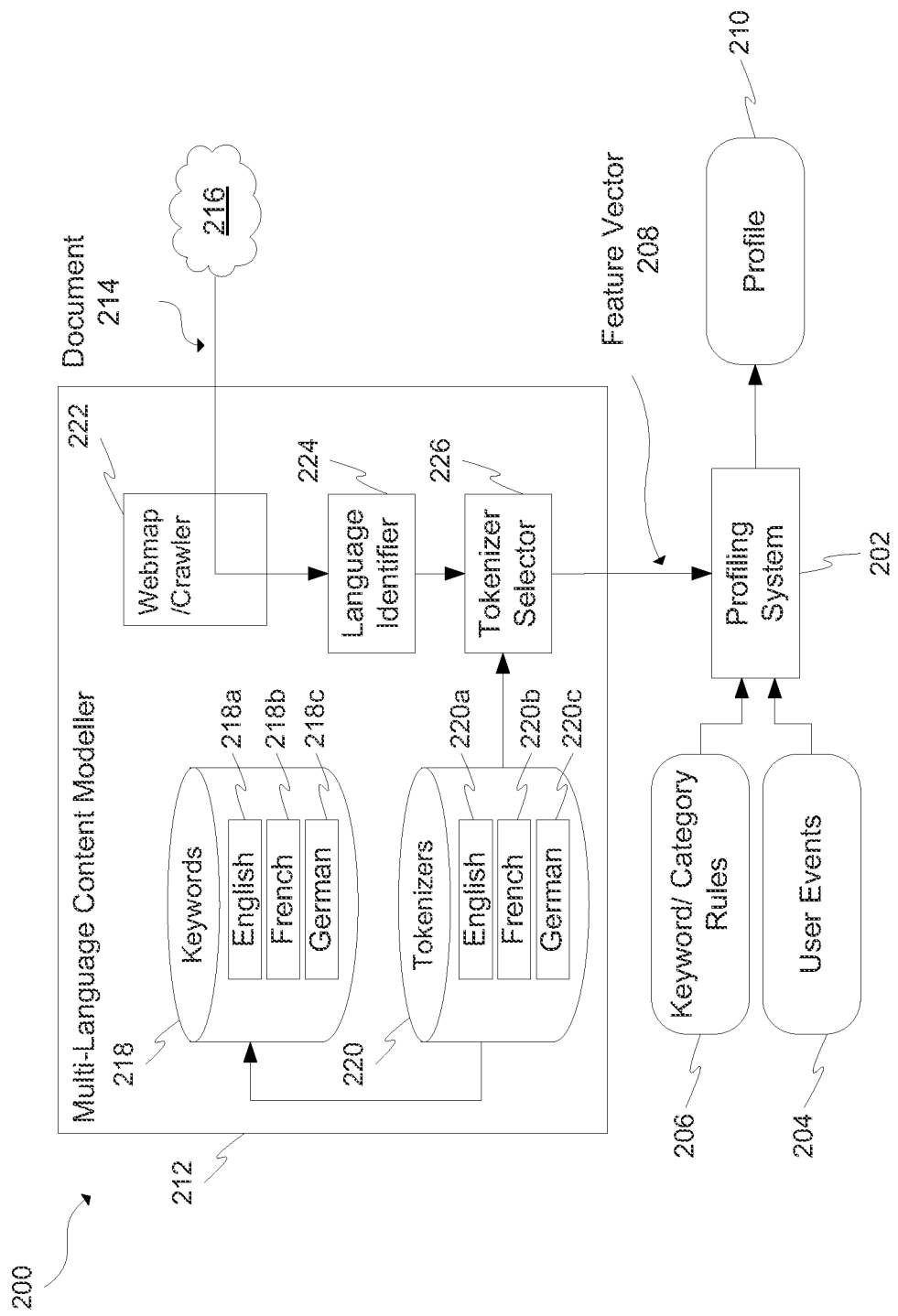
FIG. 2 depicts in a block diagram an embodiment of a system for modelling and profiling content in multiple languages.

FIG. 2 depicts in a block diagram an embodiment of a system 200 for modelling and profiling content in multiple languages. The system 200 comprises a profiling system 202 for receiving a user event 204 that includes a UserID and a ContentID. The profiling system 202 includes keyword/category rules or models 206 that are used to generate or update a profile 210 associated with the UserID of the user event 204. The profiling system 202 receives a feature vector 208 associated with the ContentID of the user event 204 and generates, or updates, the user profile based on the feature vector and the keyword/category rules or models 206. The feature vector 208 associates a score with each of one or more keywords used by the profiling system 202. The feature vector 208 is associated with a particular document that is in a particular language. As described further herein, a feature vector 208 that can be processed by the profiling system 202 may be generated regardless of the particular language the document is in.

The feature vector associated with a particular document may be generated by the content modeller 212. The content modeller 212 can generate a feature vector for a document 214 in one or more different languages. The document may be entirely in one language, or may have different parts of the document in different languages. Documents 214 may be received from various electronically accessible sources 216. Each document 214 is associated with a ContentID that uniquely identifies the document. Regardless of the language of the document, the generated feature vector may be processed in the same manner by the profiling system 202. As such, only a single profiling system 202, and associated keyword/category rules or models 206 are necessary to generate a user profile from documents in multiple languages.

The content modeller 212 may comprise a keyword repository 218 and a tokenizer repository 220. The keyword repository 218 comprises a plurality of keyword sets 218*a*, 218*b*, 218*c*. The keyword sets are depicted in FIG. 2 as being English 218*a*, French 218*b* and German 218*c*. The specific languages depicted are only examples and other languages may be used. Each keyword set 218*a*, 218*b*, 218*c* comprises a plurality of keywords in the specific language, that is the English keyword set 218*a* comprises English keywords, the French keyword set 218*b* comprises French keywords, and the German keyword set 218*c* comprises German keywords. As described further herein, each keyword in the keyword sets is also associated with a keyword identifier (ID).

Each tokenizer 220*a*, 220*b*, 220*c* is associated with a particular language and corresponding keyword set. An English tokenizer 220*a* is associated with the English keyword set 218*a*, a French tokenizer 220*b* is associated with the French keyword set 218*b*, and a German tokenizer is associated the German keyword set 218*c*.

Each tokenizer 220*a*, 220*b*, 220*c* processes a document 214 associated with content, or portion of the document, that is in the language associated with the tokenizer. The tokenizer receives the document, or portion of the document and parses it to identify keywords from the associated keyword set that occur in the received document. As described further with reference to FIG. 3, each tokenizer generates a set of ID:score pairs based on the occurrence of keywords from the associated keyword set in the document.

The content modeller 212 further includes a webcrawler 222 that retrieves documents 214 from the one or more content sources 216 for processing. The documents 214 are processed by a language identifier 224 in order to identify a language of the document 215. A tokenizer selector 226 receives the document and the indication of the language of the document, selects the tokenizer 220a, 220b, 220c for processing the document 214, which processes the document to produce a feature vector 208 that can be used by the profiling system 202, regardless of the language of the document. The language identifier 224 may determine a language of the entire document or portions thereof. The appropriate tokenizer may be selected for processing the entire document or portion thereof. Furthermore, the document does not need to be exclusively in a particular language, for example a document may be mostly in English with some words or sentences in French. The language identifier may identify the main language of the document or portion of the document.

The content modelling and profiling system 200 has a base language. The base language may be the language that the content modeller and the profiling system share or have in common. For the purposes of the description the base language is described as English. The base language keyword set (English keyword set 218a) is used to generate the additional keyword sets 218b, 218c. Each keyword in the base language keyword set is associated with an ID. The ID for each keyword in the base language keyword set may be unique. Alternatively, keywords having the same, or similar meaning may share the same ID. For example, "car" and "automobile" have a similar meaning and as such may have the same ID. Each additional keyword set 218b, 218c may be generated from the base language keyword set 218a. The base language keyword set may be translated into the additional languages. Each keyword from the base language keyword set 218a is translated to one or more keywords in the additional languages. Each translated keyword is associated with the ID of the corresponding keyword in the base language. Each keyword set 218a, 218b, 218c will have a plurality of keywords each associated with an ID. Keywords having the same or similar meaning, regardless of the language of the keyword set, are associated with the same ID. As described further with reference to FIG. 3, each tokenizer uses the ID in order to determine the frequency of occurrence used to base the score on.

The system 200 for modelling and profiling content in multiple languages may be implemented in one or more processing units and memory units (not depicted). As will be appreciated, each processing unit may comprise one or more processors coupled together. The one or more processors of the processing unit may be arranged on the same physical chip, or they may be arranged on multiple separate chips. Additionally, the processing unit may be further comprised of multiple processors or computing devices containing one or more processors coupled together, for example over a network. Similarly, each memory unit may comprise a plurality of memory devices for storing information. The memory devices of the memory unit may store information, including instructions and data, in volatile memory. The memory unit may also comprise memory devices for storing information in non-volatile storage. The profiling system 202 and the content modeller 212 are each depicted as being a single physical component, as will be appreciated the profiling system 202 and the content modeller 212 may each be implemented by the same processing unit and memory unit, or may be implemented in separate processing units and memory units. The processing and memory units that are used to implement the profiling system 202 and the content modeller 212 may include multiple physical components coupled together. The multiple components may be located in the same location or may be located in different geographical locations.

Figure 3:
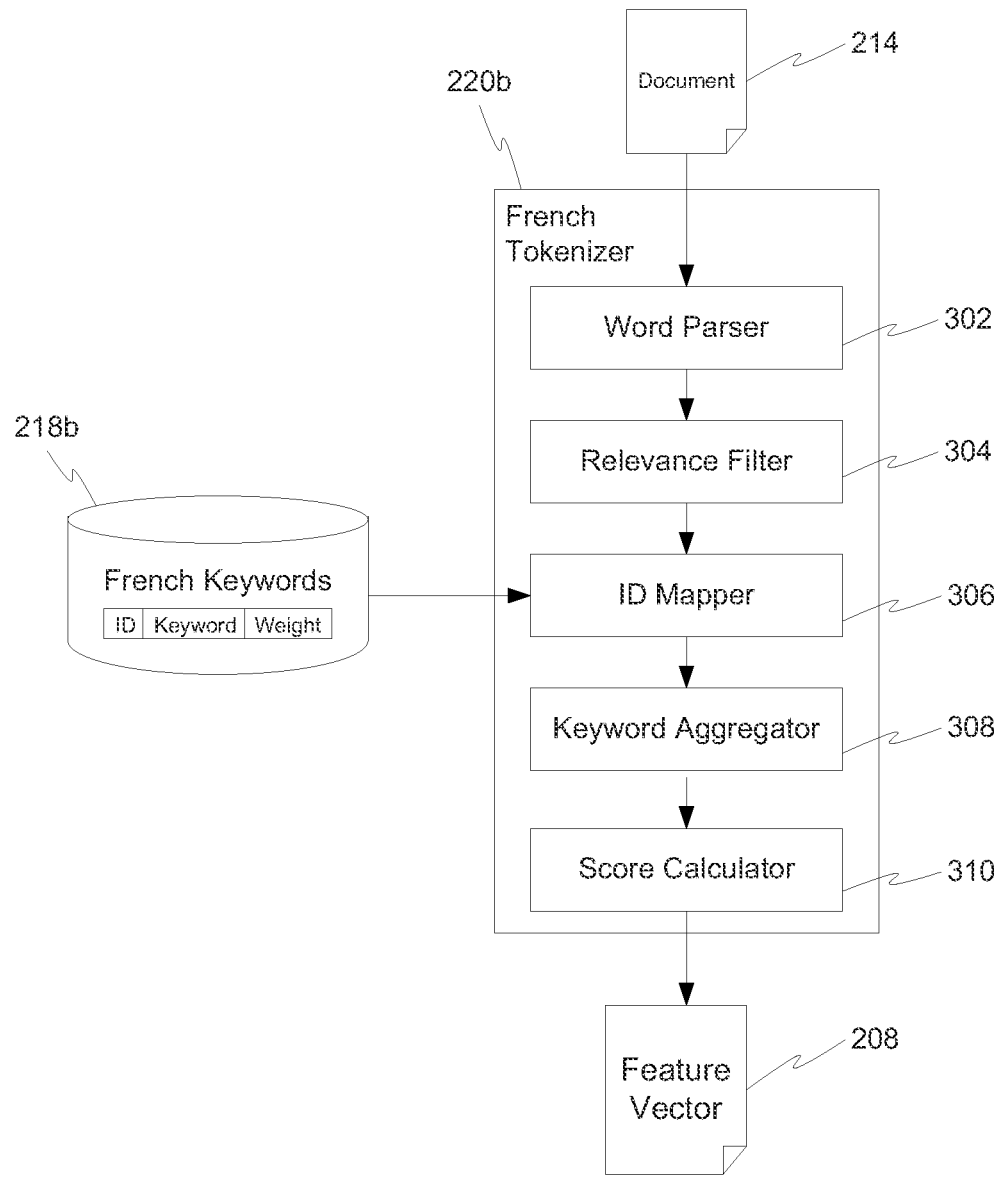
FIG. 3 depicts in a block diagram an embodiment of a tokenizer.

FIG. 3 depicts in a block diagram an embodiment of a French tokenizer 220b. The other tokenizers of the content modeller 212 function in a similar manner; however use the corresponding langue keyword set, as well as rules or procedures for parsing the language that may be specific to the particular language.

The French tokenizer 220b receives a document or portion of a document that is in French, and using the French keyword set generates a feature vector. For the clarity of the description, the feature vector is described as a plurality of ID:score pairings; however, after generated by the tokenizer, the IDs of the pairings may be translated to the corresponding keywords in the base language, that is the feature vector, although described as ID:score pairs, may be scores associated with keywords in the base language, either directly or indirectly through the ID associated with the keywords.

As described further below, the tokenizer 220b parses the document 214 to identify individual words, maps the words to IDs using the associated keyword set and determines a score for each ID based on the frequency of occurrence of the ID, or more specifically the frequency of occurrence of the one or more keywords having the ID within the document. The ID:score pairs are used to generate the feature vector 208.

As depicted in FIG. 3, the tokenizer 220b receives a document 214. The word parser 302 comprises logic for identifying individual words within the document. The word parser 302 may encapsulate specific knowledge of the particular language based on for example the grammar of the language. For example, the English tokenizer 220a may identify individual words based on the presence of a space. The word parser 302 may identify individual words in different ways, for example simple words may be identified as occurring between spaces, additionally or alternatively, words may be hyphenated and so a hyphen may be used to identify the beginning or end of a word. Furthermore, languages such as German may have compound words that need to be parsed into the root words. The specific logic used by the word parser 302 will depend on the grammar language being parsed. After the word parser 302 has processed the document 214, all of the individual words within the document will be identified.

Many of the individual words will not add to the meaning or understanding of the document 214. For example, in English "a" and "the" do not add to the meaning or understanding of the document. The tokenizer may comprise a relevance filter 304 for filtering out irrelevant words that do not further the understanding or meaning of the document. The relevance filter 304 may use a stop word list that lists words in the particular language that do not add to the understanding of the meaning of the document and so should be filtered out. Relevant words will remain after processing the identified individual words by the relevance filter.

The tokenizer 220b may further comprise an ID mapper 306. The ID mapper maps the remaining relevant words to an ID using the associated keyword set. For each of the relevant words, the ID mapper 306 determines if there is a matching word in the associated keyword set 218b, and if there is a match, the matched relevant word is mapped to the ID. An ID aggregator 308 then determines the number of occurrences of each ID. The ID mapper 306 and ID aggregator 308 are described as being separate components for the clarity of description. The functionality of the ID mapper 306 and ID aggregator 308 may be incorporated into a single component.

For example, the ID mapper 306 may determine if there is a match between the word and keyword, determine the associated ID, determine if the ID is present in an ID counting list, and if it is added to the number of occurrences associated with the ID. If the ID is not present in the ID counting list, it can be added and the associated frequency of occurrence initialized. Regardless of the specifics of the implementation, the tokenizer produces a list, or similar data structure, of IDs and their associated frequency of occurrence within the document. As noted above, more than one keyword in a language may be associated with the same ID, and so the frequency of occurrence of the ID will be the frequency of occurrence within the document of each keyword associated with the ID in the keyword set.

A score calculator 310 determines a score associated with each ID of a keyword that has occurred in the document. The score calculator 310 may determine the score in various ways. For example, the score may simply be the determined number of occurrences of the ID, or more particularly the one or more keywords associated with the ID. Alternatively, the frequency of occurrence of each ID may be normalized using, for example the number of words in the document, the number of relevant words in the document, the number of IDs in the document, or a combination thereof.

As depicted in FIG. 3, in addition to the ID, each keyword in the keyword set 218b, as well as other keyword sets in the content modeller 208, may also be associated with a weight. The weight may be used as a weighting factor by the score calculator 310 when determining the score associated with an ID. The weight of a keyword, or ID may be pre-determined in various ways. For example, if a selection of documents in the particular language are available, the weight for each keyword may be determined based on the total frequency of occurrence of the keyword within the selection of documents. The weight may be normalized based on the number of documents from the selection of documents that the keyword occurs in.

The ID:score pairings are used to provide the feature vector of the particular document to the profiling system 202. The ID:score pairings may be used directly as the feature vector, or the IDs may be mapped to a corresponding keyword in the base language keyword set. Regardless of the specific implementation of the feature vector, the score is associated with a keyword in the base language keyword set, either directly or through the IDs.

From the above, each tokenizer 220a, 220b, 220c generates a feature vector that associates a score with a keyword in the base language keyword set. The feature vector is generated using the keyword set associated with the tokenizer. The feature vector produced by the different language tokenizers are processed in the same way by the profiling system 202. As such, regardless of the language of the document, a feature vector can be produced for processing by the single profiling system 202 since IDs are independent of any particular language. As such, a user profile may be based on documents viewed or requested by the user that are in different languages. The content modelling and profiling system may generate a user profile from documents in different languages without requiring multiple, language specific profiling systems.

Figure 4:
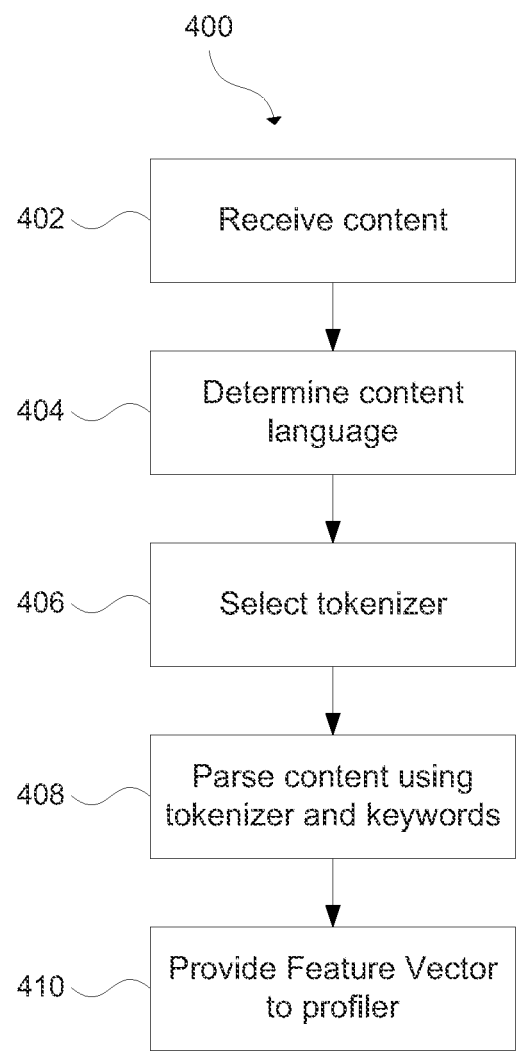
FIG. 4 depicts in a flow chart a method of generating a feature vector for documents in multiple languages.

FIG. 4 depicts in a flow chart a method 400 of generating a feature vector for documents in multiple languages. The feature vectors generated according to the method 400 may be used to generate a user profile. The method 400 receives a document 402, or an indication of a document such as a ContentID associated with the document associated with content. The document is either entirely or partially in a particular language. A language of the document is determined. If the document is not entirely in one language, the determined language may be the language used for the majority of the document. Additionally or alternatively, if the document is not entirely in one language, different portions of the document that are each in different languages may be identified and the language of each portion of the document determined. The portions of the document in different languages may then be treated as separate documents. Based on the determined language of the document, an appropriate tokenizer is selected 406 for processing the document. Once the appropriate tokenizer is selected, it is used to parse the document using a keyword set 408 associated with the selected tokenizer. The tokenizer produces a feature vector from the parsed content that comprises a plurality of pairings that each associate a score with one or more keywords in a base language that are associated with the same ID in a base language keyword set. Once the feature vector is produced it is provided to a profiler 410. The feature vector may be associated with a contentID that can be used by the profiler to retrieve the feature vector when a user accesses or requests the associated content. The profiler may then use the feature vector to generate or update a user profile.

Figure 5:
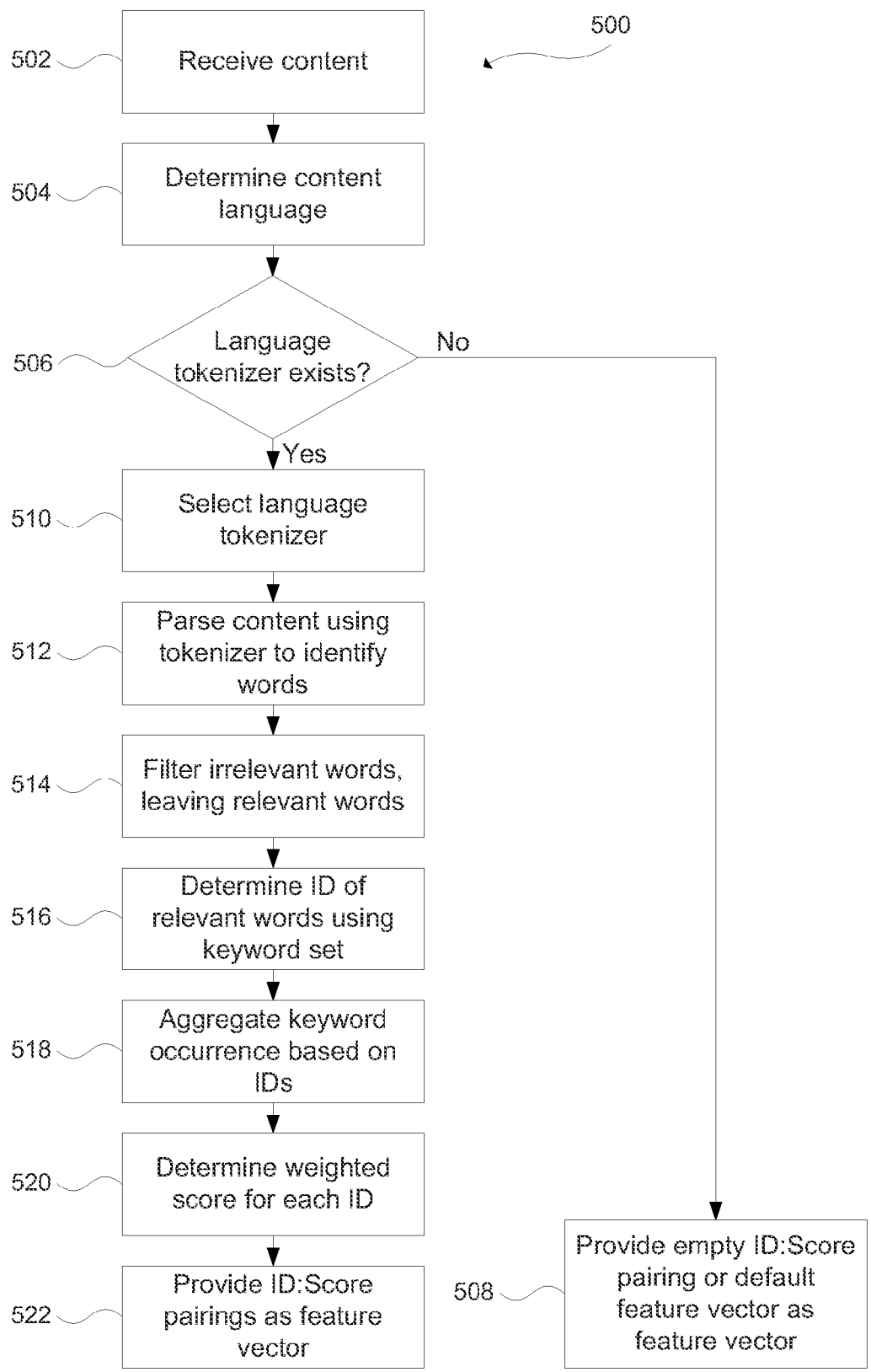
FIG. 5 depicts in a flow chart a further method of generating a feature vector for documents in multiple languages in more detail.

FIG. 5 depicts in a flow chart a further method 500 of generating a feature vector for documents in multiple languages. Similar to the method 400, the method 500 receives a document 502 and determines the language of the document 502. The method 500 determines if a tokenizer for the identified language exists 506. If no tokenizer exists (No at 506) an empty feature vector or a default feature vector may be provided 508. Alternatively, an error may be provided indicating that no tokenizer exists for the identified language. If it is determined that a tokenizer exists for processing the identified language (Yes at 510) it is selected 512. The selected tokenizer is used to parse the document in order to identify individual words in the document according to the grammar rules of the particular language encapsulated in the tokenizer. The individual words are filtered in remove irrelevant words, leaving only the relevant words to determining the content model 514. The IDs of the relevant words are determined using the keyword set for the determined language 516. The IDs are aggregated in order to determine a frequency of occurrence of the IDs 518, or the one or more keywords in the document associated with the IDs. All of the relevant words may be mapped to IDs and then the IDs aggregated, or the IDs may be aggregated as they relevant words are mapped to the IDs. A weighted score for each ID is determined using a weight associated with the ID in the keyword set 520. The scores and associated IDs may be used as the feature vector, or the IDs may be translated to the corresponding keywords of the base language keyword set and the scores and associated base language keywords may be used as the feature vector. Regardless of the specific representation of the feature vector it is provided to the profiler 522. The profiler may use the feature vector to generate user profiles based on documents in various languages.

Figure 6:
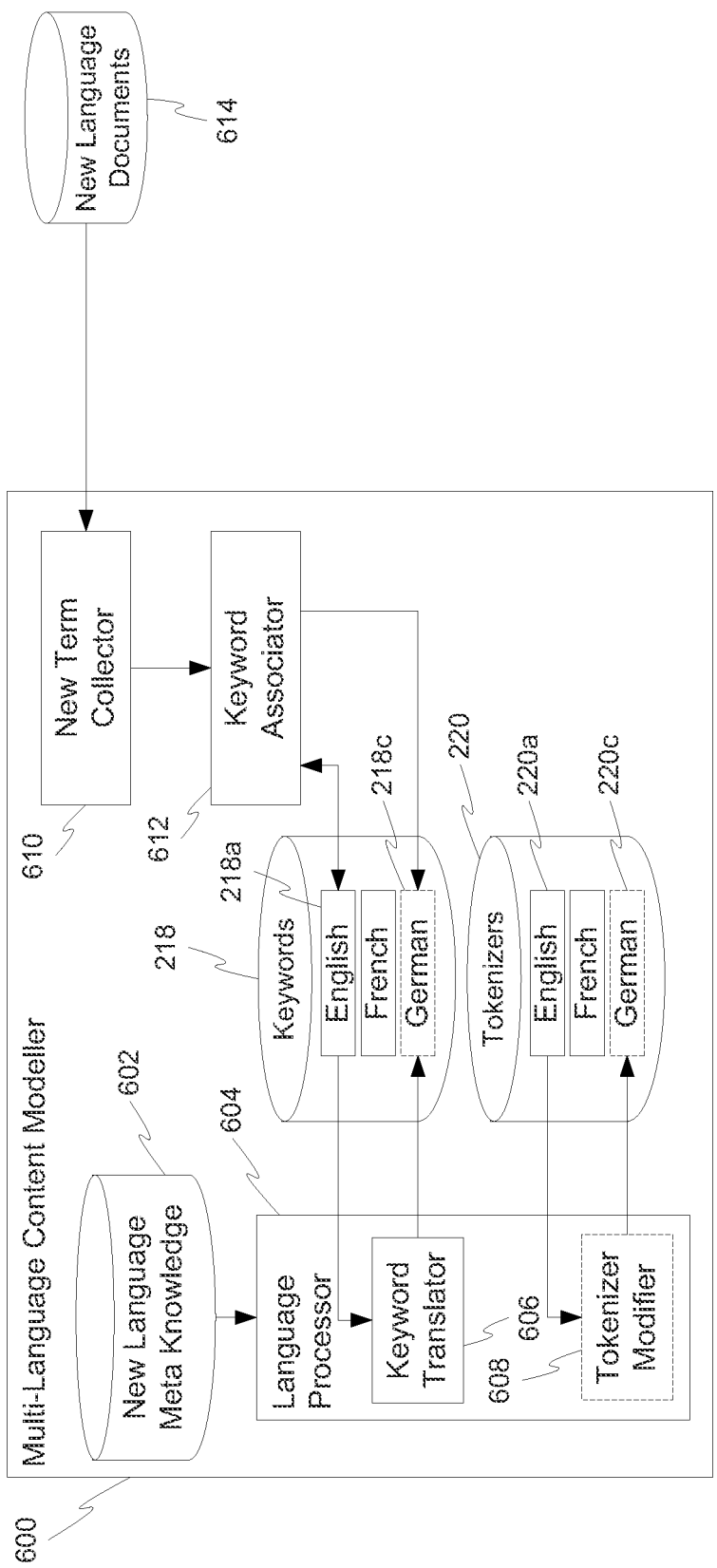
FIG. 6 depicts in a block diagram an embodiment of a content modeller.

FIG. 6 depicts in a block diagram an embodiment of a content modeller 600. The content modeller 600 may be used to generate and maintain the additional keyword sets and tokenizers used by the content modeller 208 to produce feature vectors of documents in different languages. The content modeller 600 includes a base language keyword set, for example English keyword set 218a, and a corresponding base language tokenizer, for example English tokenizer 220a. The content modeller 600 may include one or more additional keyword sets and tokenizers, for example French keyword set 218b and French tokenizer 220b. The content modeller 600 may be used to generate a further keyword set and corresponding tokenizer, such as German keyword set 218c and German tokenizer 220c. The content modeller 600 uses the base language keyword set and new language meta knowledge 602 to generate the new language keyword set. A language processor 604 may use the new language meta knowledge 602. A keyword translator 606 may generate the new language keyword set 218c by translating the keywords of the base language keyword set into corresponding keywords in the new language and associating the translated keywords with the ID of the base language keyword, or keywords, having a corresponding meaning.

A tokenizer modifier 608 may use the base language tokenizer, or another existing tokenizer for parsing a language having similar grammatical rules as the target language, in order to produce the new language tokenizer 220c. The tokenizer modifier 608 may automatically generate the new language tokenizer from an existing language tokenizer using the new language meta knowledge 602. Additionally or alternatively, the tokenizer modifier 608 may provide functionality to allow a developer to modify an existing tokenizer in order to generate a new language tokenizer that encapsulates the grammatical rules of the new language. Alternatively, a new language tokenizer may be generated without use of the tokenizer modifier 608 and provided to the content modeller 600 or tokenizer repository.

The content modeller 600 may further include a new term collector 610 and a keyword associator 612, for adding keywords in the new language to the new language keyword set 618c. The term collector 610 may process one or more documents 614 in the new language received from various sources in order to identify keywords that occur with a frequency above a particular threshold that are not already in the keyword set of the new language. Any keywords that occur with a high frequency may be provided to the keyword associator 612. The keyword associator 612 associates the new keywords with an ID of a base language keyword having a corresponding meaning. If a base language keyword having a corresponding meaning is not present in the base language keyword set, a new keyword is added that corresponds in meaning to the new keyword of the new language. The new keyword in the base language keyword set is associated with an ID, which is also associated with the corresponding keyword of the new language. The new keyword may be associated with a corresponding base language keyword in various ways, for example, by translating the keyword from the new language to the base language, or receiving an indication of the corresponding keyword in the base language. The new language keyword and associated ID is stored in the new language keyword set.

Figure 7:
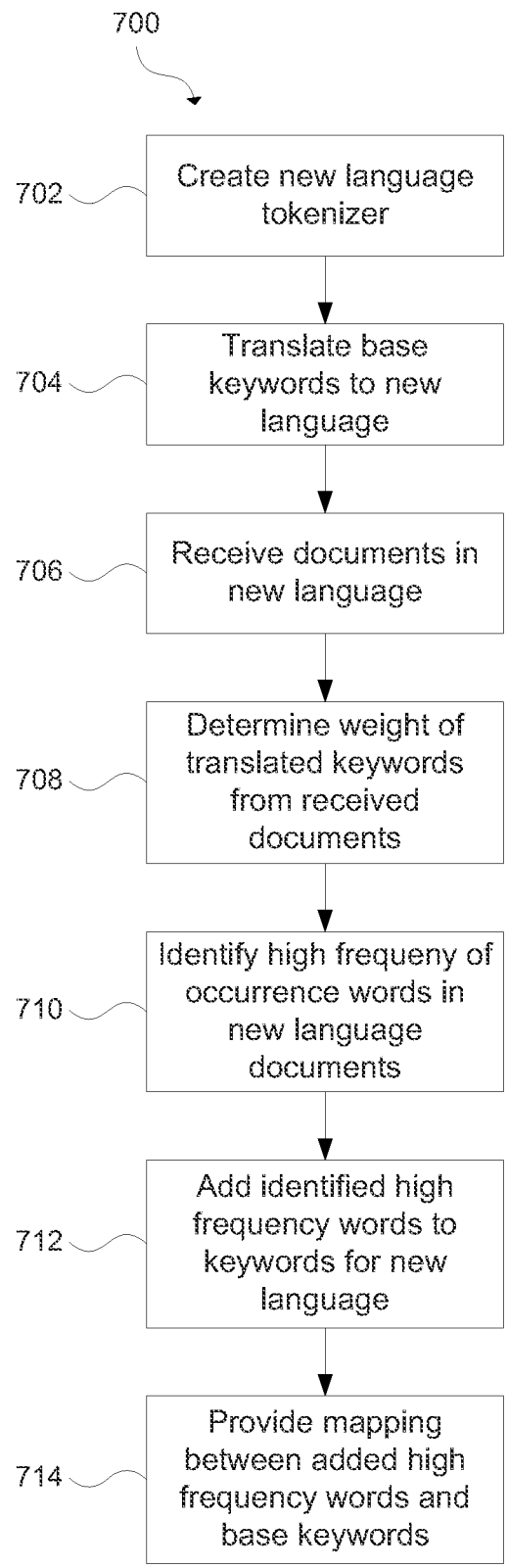
FIG. 7 depicts in a flow chart a method of adding a new language to the content modeller.

FIG. 7 depicts in a flow chart a method 700 of adding a new language to the content modeller. The method 700 creates a tokenizer for the new language 702. The new tokenizer may be created by modifying an existing tokenizer using meta knowledge of the new language. Keywords of the base language are translated to the new language 704 and associated with the ID of the corresponding base language keywords in a new language keyword set. One or more documents in the new language are received 706 and processed in order to determine a weight associated with each of the keywords in the new language 708. Alternatively, the weights associated with the corresponding base language keywords may be used as the weights for the new language keywords. High frequency keywords that occur in the received documents are identified 710 and added to the new language keyword set if they are not already present 712. A mapping between the added high frequency keywords and the base language keywords is provided 714. If new base language keyword exists that corresponds to the high frequency new language keyword, it is determined and added to the base language keyword.

The systems and methods described above provide the ability to model documents in different languages in a manner that allows a user profile to be determined using the feature vectors. The ability to model documents in new languages can be provided by simply providing a new tokenizer for the particular language and translating the existing keywords to the new language. The system and methods described herein have been described with reference to various examples. It will be appreciated that components from the various examples may be combined together, or components of the examples removed or modified. As described the system may be implemented in one or more hardware components including a processing unit and a memory unit that are configured to provide the functionality as described herein. Furthermore, a computer readable memory may store computer readable instructions for configuring one or more hardware components to provide the functionality described herein.

What is claimed is:

1. A content modeling system comprising:
a memory unit for storing instructions and data; and
a processing unit for executing the instructions to generate feature vectors of documents in different languages, the feature vectors providing scores associated with keywords defined in a base language for use by a profiler for generating or updating a user profile defining user preferences, the processing unit further for executing the instructions to provide:
  a keyword repository storing a plurality of keyword sets comprising:
    a base language keyword set comprising a plurality of base language keywords each associated with a respective identifier (ID), wherein each respective ID is unique for each of the plurality of base language keywords; and
    a second language keyword set comprising a plurality of second language keywords each corresponding in meaning to a respective one of the base language keywords and associated with the ID of the corresponding base language keyword;
  a plurality of tokenizers, each tokenizer associated with a language and a respective keyword set of the plurality of keyword sets, each tokenizer for:
    receiving a text based document in the associated language of the tokenizer;
    parsing the received document to identify keywords from the associated keyword set occurring in the received document; and
    generating, as a feature vector, a plurality of ID:score pairs, each pair associating a score with an ID of a keyword in the associated keyword set occurring in the document, the score based on the frequency of occurrence of the ID corresponding to the keyword in the document and a relevance weighting associated with the keyword, wherein the relevance weighting is based on a frequency of occurrence of the keyword in a set of previously collected documents;
  a language identifier for receiving the document and identifying the language of the document as one of the base language or the second language; and
  a tokenizer selector for receiving the identified language and selecting a corresponding tokenizer to parse the received document and produce a feature vector of the received document from the generated ID:score pairs.

2. The system of claim 1, wherein each tokenizer comprises a word parser for identifying words in the received document according to grammar rules of the language associated with the parser, the identified words compared to the keywords from the keyword set associated with the respective tokenizer.

3. The system of claim 2, wherein each tokenizer further comprises a relevance filter for filtering out irrelevant words from the document prior to comparing the words to the keywords.

4. The system of claim 1, wherein each tokenizer comprises an ID mapper for comparing words of the received document to keywords from the keyword set associated with the tokenizer and mapping a word to an ID of the corresponding keyword when the word matches the keyword.

5. The system of claim 4, wherein each tokenizer further comprises a keyword aggregator for determining the frequency of occurrence of each mapped ID for use in determining the score associated with each ID.

6. The system of claim 1, further comprising:
a high frequency word identifier for identifying one or more words occurring with a frequency above a threshold in a plurality of received documents in a same language and adding the identified one or more words with an associated ID to the corresponding language keyword set if the one or more words are not already in the keywords set.

7. The system of claim 1, wherein each keyword and associated ID in the base language keyword set is further associated with the relevance weighting for use in determining scores of ID:score pairings.

8. The system of claim 1, wherein the relevance weighting of the keyword is determined based on the frequency of occurrence of the keyword within a set of previously collected documents in a common language and a frequency of occurrence of the documents which includes the keyword.

9. The system of claim 1, further comprising one or more additional language tokenizers and associated keyword sets.

10. A method for generating feature vectors of documents in different languages, the method comprising:
receiving at a processing unit a document and identifying the language of the document as one of a base language or a second language;
selecting a corresponding tokenizer based on the identified language to parse the received document and produce a feature vector of the received document, the tokenizer selected from a plurality of tokenizers stored in a memory unit, each tokenizer of the plurality of tokenizers associated with a language and a respective keyword set of a plurality of keyword sets stored in a keyword repository of the memory unit;
parsing the received document using the selected tokenizer to identify keywords occurring in the received document, the keywords stored in a keyword set associated with the language of the selected tokenizer and an identifier (ID) of a corresponding keyword in a base language keyword set, wherein each respective ID is unique for each keyword of the base language keyword set; and
generating a feature vector from a plurality of ID:score pairs, each pair associating a score with an ID of a keyword in the associated keyword set occurring in the document, the score based on the frequency of occurrence of the ID corresponding to the keyword in the document and a relevance weighting associated with the keyword, wherein the relevance weighting is based on a frequency of occurrence of the keyword in a set of previously collected documents, the feature vector providing scores associated with keywords defined in a base language for use by a profiler for generating or updating a user profile defining user preferences.

11. The method of claim 10, wherein parsing the received document further comprises identifying words in the received document according to grammar rules of the language associated with the parser, the identified words compared to the keywords from the keyword set associated with the selected tokenizer.

12. The method of claim 11, wherein parsing the received document further comprises filtering out irrelevant words in the document prior to comparing the words to the keywords.

13. The method of claim 10, wherein parsing the received document further comprises comparing words of the received document to keywords from the keyword set associated with the tokenizer and mapping a word to an ID of the corresponding keyword when the word matches the keyword.

14. The method of claim 13, wherein parsing the received document further comprises aggregating keywords for determining the frequency of occurrence of each mapped ID for use in determining the score associated with each ID.

15. The method of claim 10, wherein the relevance weighting of the keyword is determined based on the frequency of occurrence of the keyword within a set of previously collected documents in a common language and a frequency of occurrence of the documents which includes the keyword.

16. The method of claim 10, further comprising:
providing the ID:score pairs to predict categories of interest of a user having requested the document.

17. The method of claim 10, further comprising:
receiving meta knowledge on a new language;
generating a new tokenizer for processing documents in the new language and storing it in the memory unit;
translating a plurality of keywords in a base language into keywords in the new language, the translated keywords having the same ID as the corresponding base language keywords; and
storing the translated keywords in the memory unit.

18. The method of claim 17, further comprising:
identifying one or more keywords occurring at a high frequency in the new language, and not translated from the base language keywords;
storing the identified one or more keywords in the memory unit; and
assigning an ID to each of the identified one or more keywords.

19. The method of claim 18, wherein assigning the ID to each of the identified one or more keywords comprises:
determining if a corresponding keyword exists in the base language keyword set;
assigning the ID associated with the corresponding keyword in the base language keyword set when it exists; and
determining a corresponding keyword in the base language, associating an ID with the corresponding keyword in the base language and assigning the ID associated with the corresponding keyword in the base language when the corresponding keyword does not exist in the base language keyword set.

20. A non-transitory computer readable memory storing instructions for configuring a processing unit and a memory unit for providing a method for generating feature vectors of documents in different languages, the method comprising:

receiving at the processing unit a document and identifying the language of the document as one of a base language or a second language;

selecting a corresponding tokenizer based on the identified language to parse the received document and produce a feature vector of the received document, the tokenizer selected from a plurality of tokenizers stored in a memory unit, each tokenizer of the plurality of tokenizers associated with a language and a respective keyword set of a plurality of keyword sets stored in a keyword repository of the memory unit;

parsing the received document using the selected tokenizer to identify keywords occurring in the received document, the keywords stored in a keyword set associated with the language of the selected tokenizer and an identifier (ID) of a corresponding keyword in a base language keyword set, wherein each respective ID is unique for each keyword in the base language keyword set; and generating a feature vector from a plurality of ID:score pairs, each pair associating a score with an ID of a keyword in the associated keyword set occurring in the document, the score based on the frequency of occurrence of the ID corresponding to the keyword in the document and a relevance weighting associated with the keyword, wherein the relevance weighting is based on a frequency of occurrence of the keyword in a set of previously collected documents, the feature vector providing scores associated with keywords defined in a base language for use by a profiler for generating or updating a user profile defining user preferences.

\* \* \* \* \*